(12) United States Patent
Raab et al.

(10) Patent No.: US 6,612,044 B2
(45) Date of Patent: Sep. 2, 2003

(54) METHOD, SYSTEM AND STORAGE MEDIUM FOR PROVIDING AN EXECUTABLE PROGRAM TO A COORDINATE MEASUREMENT SYSTEM

(75) Inventors: Simon Raab, Maitland, FL (US); Daniel Perreault, Lake Mary, FL (US); Shaun Mymudes, Deltona, FL (US); Scott Adams, Orlando, FL (US); Orlando Perez, Lake Mary, FL (US); Ken Steffey, Lake Mary, FL (US); Robert Pearce, Altamonte Springs, FL (US); Paul Atwell, Lake Mary, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 09/775,236

(22) Filed: Feb. 1, 2001

(65) Prior Publication Data

US 2002/0032541 A1 Mar. 14, 2002

Related U.S. Application Data

(60) Provisional application No. 60/178,926, filed on Feb. 1, 2000, and provisional application No. 60/229,423, filed on Sep. 5, 2000.

(51) Int. Cl.$^7$ .......................... G06F 9/445; G01B 7/008
(52) U.S. Cl. .......................... 33/503; 705/26; 700/161; 700/245
(58) Field of Search .................. 33/503, 504; 717/168, 717/171, 172, 173, 174, 176, 177, 178; 700/245; 702/95, 150; 705/26

(56) References Cited

U.S. PATENT DOCUMENTS

| | | | | |
|---|---|---|---|---|
| 5,375,206 A | * | 12/1994 | Hunter et al. | 717/176 |
| 5,402,582 A | | 4/1995 | Raab | 33/503 |
| 5,696,869 A | * | 12/1997 | Abecassis | 386/52 |
| 5,724,264 A | * | 3/1998 | Rosenberg et al. | 700/161 |
| 5,978,748 A | | 11/1999 | Raab | 702/150 |
| 6,080,207 A | * | 6/2000 | Kroening et al. | 717/172 |
| 6,167,568 A | * | 12/2000 | Gandel et al. | 705/26 |
| 6,189,146 B1 | * | 2/2001 | Misra et al. | 717/177 |
| 6,298,480 B1 | * | 10/2001 | Beuk et al. | 717/171 |
| 6,301,707 B1 | * | 10/2001 | Carroll et al. | 717/177 |
| 6,347,398 B1 | * | 2/2002 | Parthasarathy et al. | 717/178 |
| 6,397,385 B1 | * | 5/2002 | Kravitz | 717/171 |

* cited by examiner

*Primary Examiner*—Christopher W. Fulton
(74) *Attorney, Agent, or Firm*—Cantor Colburn LLP

(57) ABSTRACT

An exemplary embodiment of the invention is a method of providing an executable program from an executable program provider to a customer for use in a controller of a three dimensional coordinate measurement system. The method includes receiving a request to create an executable program from a customer and obtaining information related to the executable program. The executable program is developed which guides an operator through a number of measurement steps to be performed with the three dimensional coordinate measuring system. The executable program is delivered to the customer over a network.

73 Claims, 17 Drawing Sheets

METHOD, SYSTEM AND STORAGE MEDIUM FOR PROVIDING AN EXECUTABLE PROGRAM TO A COORDINATE MEASUREMENT SYSTEM

CROSS-REFERENCE TO RELATED APPLICATIONS

This application claims the benefit of U.S. provisional patent application Ser. No. 60/178,926 filed Feb. 1, 2000, the entire contents of which are incorporated herein by reference, and claims the benefit of U.S. provisional patent application Ser. No. 60/229,423 filed Sep. 5, 2000, the entire contents of which are incorporated herein by reference.

BACKGROUND OF THE INVENTION

The invention relates in general to coordinate measurement machines (CMMs) and in particular to method and system for providing an executable program to a controller for use in coordinate measuring system.

The manufacturing/industrial marketplace took on a new face during the 1980's with the introduction of computer-aided design (CAD) and computer-aided manufacturing (CAM). While CAD allowed engineers to produce 3-D images in the front end of the design process, which shortened the production cycle and led to tremendous gains in productivity, CAM software and equipment increased the efficiency and quality of machined single parts. In essence, these new technologies revolutionized the marketplace by increasing productivity, improving quality and reducing costs.

Despite these technological advances in design and manufacturing, something important was missing from the production cycle: a highly accurate, efficient, and convenient measurement methodology for ensuring that the products and components—both on and off the production line—met the original CAD specifications. The design process, with the help of CAD, had become innovative and sophisticated; so too, had the machining process through CAM. Yet measuring the assemblies made of these parts against the CAD model, for the most part, has continued to remain unwieldy, expensive and unreliable. Traditionally, the measurement and quality inspection function in the manufacturing process has been time-consuming and limited in size, scope, and effectiveness for a number of reasons. Manual measurement tools, such as calipers and scales may be slow, imprecise, and always one-dimensional. Analog test fixtures are costly and inflexible. Standard, non-portable coordinate measurement machines (CMM), while providing a high degree of precision, are generally located in quality control labs or inspection departments at a distance from the manufacturing floor. Parts must be removed one at a time and transported to the lab for inspection. As a result, these CMMs measure only small, readily-moved subassemblies and components—which often translates into significant "down time" for the production line. In essence, traditional measurement techniques—also known as metrology—have lagged far behind in the technological advance of the production process.

The CAD/CAM and metrology markets, as well as a worldwide emphasis on quality in all aspects of the manufacturing process, are driving the need for an extension of the CAD/CAM techniques which is referred to as computer-aided manufacturing measurement. Computer-aided manufacturing measurement is CAD-based total quality assurance technology. This last phase of the CAD revolution has remained incomplete because of the significant technical demands for adaptive measurement hardware and usable CAD-based measurement software for the difficult manufacturing environment. Computer-aided manufacturing measurement takes conventional metrology from a single-parts-only, high-level precision testing methodology—behind the door of the quality control lab—to a whole products, intermediate-level precision measurement system at every step of the manufacturing process—at any location on the factory floor. Measurements of part dimensions and/or characteristics may be made on the production floor to determine compliance with specifications and ensure quality.

FIG. 1 is a diagrammatic view of a conventional, portable CMM 10 comprised of a manually operated multi-jointed arm 12 and a support base or post 14, a serial box 16 and a host computer 18. It will be appreciated that arm 12 electronically communicates with serial box 16 which, in turn, electronically communicates with host computer 18. Additional detail of the conventional three-dimensional measuring system can be found in U.S. Pat. No. 5,402,582, the contents of which are incorporated herein by reference.

An improvement to the three dimensional coordinate measuring system of FIG. 1 is described in U.S. Pat. No. 5,978,748, the contents of which are incorporated herein by reference. This patent discloses a system in which a controller is mounted to the arm and runs an executable program which directs the user through a process such as an inspection procedure. In such a system, a host computer may be used to generate the executable program. The controller mounted to the arm is used to run the executable program but cannot be used to create executable programs or modify executable programs. By way of analogy to video gaming systems, the host computer serves as the platform for writing or modifying a video game and the arm mounted controller serves as the platform for playing a video game. The controller (e.g., player) cannot modify the executable program. As described in U.S. Pat. No. 5,978,748, this results in a lower cost three dimensional coordinate measurement system by eliminating the need for a host computer for each articulated arm. There is a need, however, for a method and system for delivering executable programs to users of coordinate measurement systems. Such a method and system would render the coordinate measurement system more versatile and readily adaptable to computer-aided manufacturing measurement.

SUMMARY OF THE INVENTION

An exemplary embodiment of the invention is a method of providing an executable program from an executable program provider to a customer for use in a controller of a three dimensional coordinate measurement system. The method includes receiving a request to create an executable program from a customer and obtaining information related to the executable program. The executable program is developed which guides an operator through a number of measurement steps to be performed with the three dimensional coordinate measuring system. The executable program is delivered to the customer.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike.

DETAILED DESCRIPTION OF PREFERRED EMBODIMENTS

Figure 1:
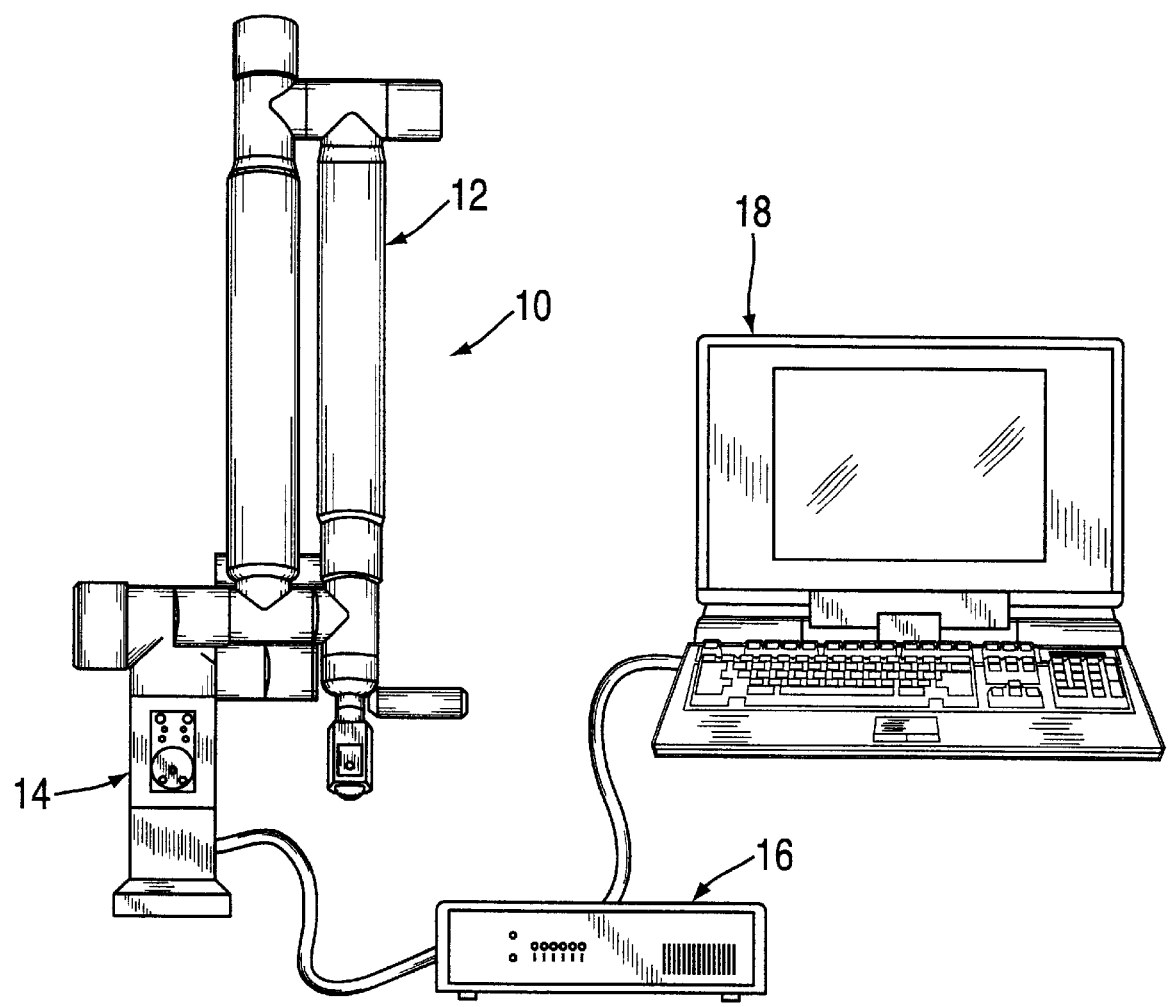
FIG. 1 is a diagrammatic view of a conventional coordinate measurement system.
Figure 2:
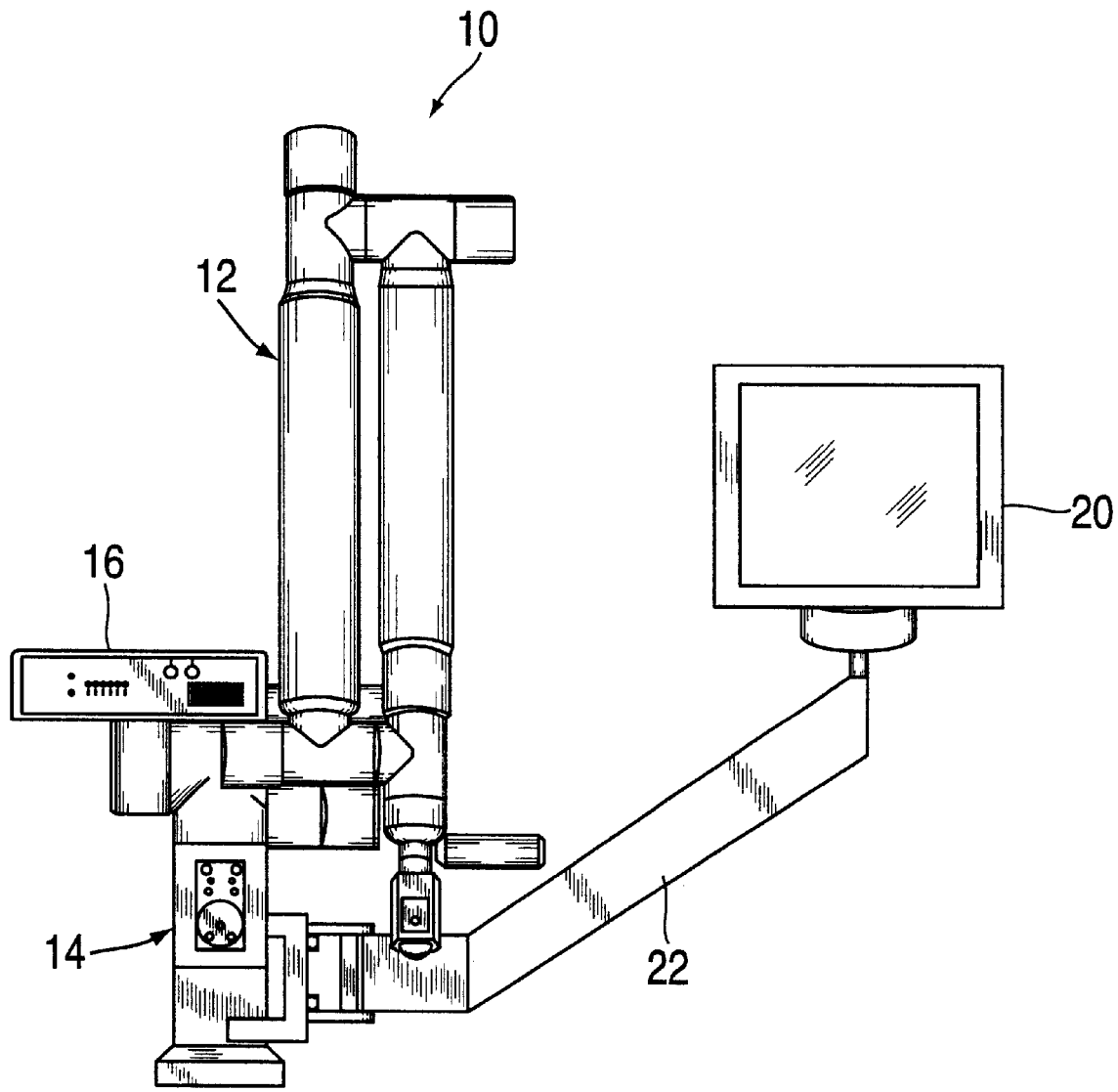
FIG. 2 is a diagrammatic view of a coordinate measurement system in an embodiment of the invention.

FIG. 2 is a diagrammatic view of a coordinate measurement system shown generally at 10 in an embodiment of the present invention. The coordinate measurement system 10 is also referred to as a control station and is operated by a human operator to inspect a part. The system 10 includes an articulated arm 12 mounted to a base or post 14. The arm 12 includes a plurality of rotational transfer housings each providing a degree of freedom to the articulated arm 12 to allow articulated arm 12 to measure points in three dimensional space. A serial box 16 is shown mounted directly to the arm 12 as described in U.S. Pat. No. 5,926,782, the contents of which are incorporated herein by reference. The serial box 16 conditions signals from the transfer housings for processing by a controller. The serial box 16 may be removably mounted to the arm 12 or completely separate from the arm 12. A user interface 20 is connected to base 14 of arm 12 through a mechanical linkage 22. The user interface 20 provides instructions to the user and receives input from the user as described in detail herein with reference to FIG. 3. A controller 40 (FIG. 3) may be included in the housing of the user interface or may be a stand-alone device separate from the user interface 20. The user interface 20 may be mounted (either permanently or removably) to the arm 12, including the base 14. The controller 40 may also be mounted (either permanently or removably) to the arm 12, including the base. Alternatively, one or both of the controller 40 and the user interface 20 may be separate from the arm 12.

Figure 3:
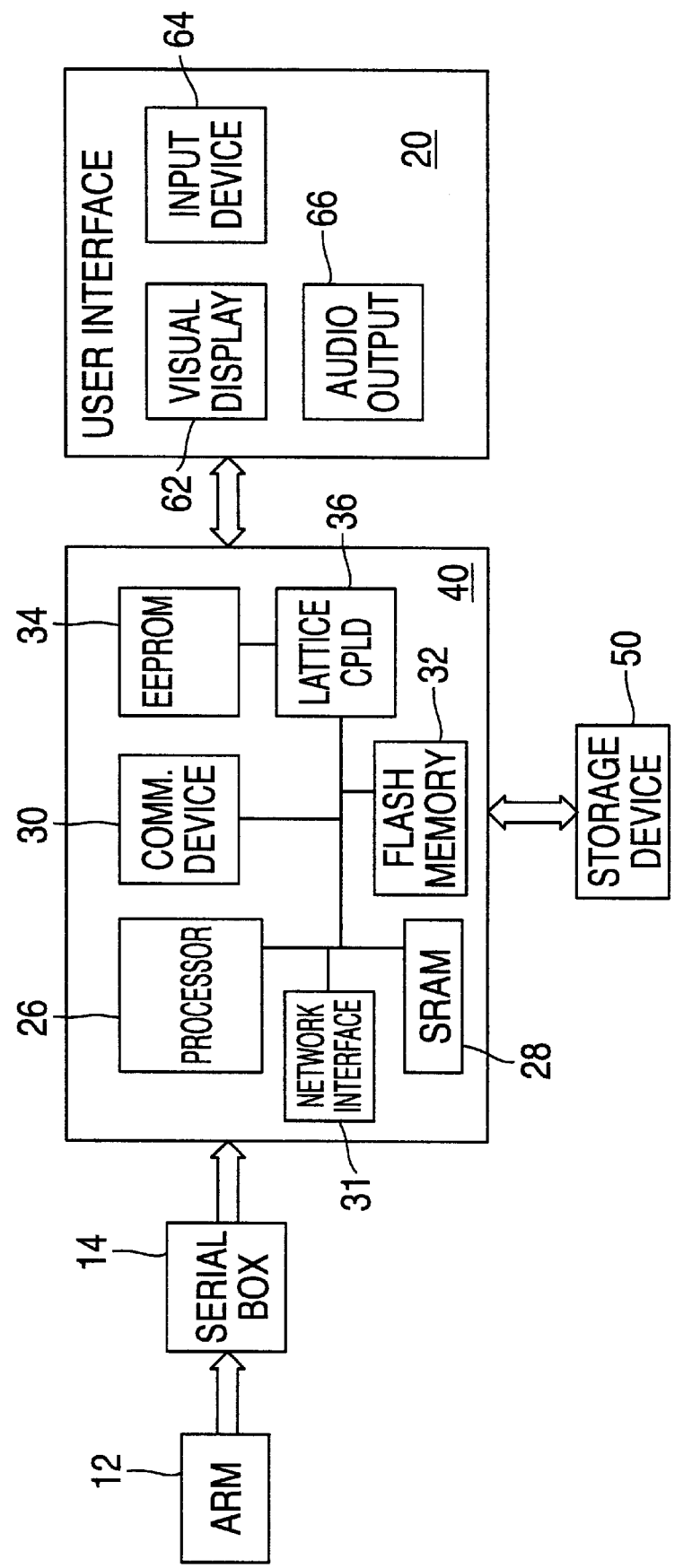
FIG. 3 is a block diagram of the coordinate measurement system of FIG. 2.

FIG. 3 is a block diagram of the coordinate measurement system 10. As known in the art, one or more of the transfer housings includes a transducer which generates signals indicating a location of the arm in three dimensional space. These signals from the transducers are provided to a serial box 16 for processing. The controller 40 receives the processed signals from the serial box 16. In an alternative embodiment, the serial box 16 is eliminated and the controller 40 is programmed to process signals directly from the transducers in the arm 12. Controller 40 may be similar to the controller described in U.S. Pat. No. 5,978,748 or may be a more complex device such as a stand-alone general-purpose computer.

The controller 40 includes a processor 26 and static random access memory (SRAM) 28 for storing instructions to be executed by processor 26. One or more executable programs may be stored in memory 28. An exemplary executable program is an inspection protocol that directs the operator through an inspection procedure. Another type of executable program is a tutorial for introducing an operator to the arm 12 and its operation. It is understood that other types of executable programs (calibration, diagnostic, etc.) may be stored in memory 28. The executable programs typically direct a human operator to manipulate the arm 12 to record certain measurements. The user can select a particular executable program from a menu presented on the user interface 20 as described herein. Controller 40 also stores reference (e.g. CAD) data. The reference data may be an entire CAD file corresponding to an entire object to be measured or just portions of the CAD data. As described in further detail, the controller 40 compares measurements from the arm 12 to reference data to generate reports.

A communication device 30 (for example a universal asynchronous receiver/transmitter) enables communication from the controller 40 to outside devices such as a computer storing an executable program for upload onto controller 40. This allows the executable programs to be uploaded into the controller 40 through communication device 30. In addition, the actual measurement data and the results of the comparisons of the actual data to reference data can be downloaded to a host computer and stored. Flash memory 32 stores program instructions and arm parameters permanently. A lattice complex programmable logic device (CPLD) 36 and associated electrically erasable programmable read only memory (EEPROM) 34 are also included in the controller 24. The CPLD 36 contains interconnection logic between the components of controller 24. The particular memory devices shown in FIG. 3 are exemplary and it is understood that a variety of memory configurations may be used.

As shown in FIG. 3, the controller may also include a network interface 31 (e.g. an Ethernet card) for allowing the controller 40 to communicate over a network such as a local area network, wide are network, intranet, internet, etc. The network serves as a communication path and does not perform functions associated with the conventional host computer described above. A conventional host computer would control the measurement process whereas the network simply provides a communications path for operations such as uploading executable programs and/or reference data into the controller 40 or downloading the actual measurement data and the results of the comparisons of the actual data to reference data.

A storage device 50 is coupled to the controller 40 for multiple functions. The storage device 50 may be any type of storage device including a floppy disc drive, compact disc drive, etc. The storage device 50 may be used to upload executable programs and/or reference data to the memory 28 in controller 40. In addition, the controller 40, in performing an executable program, may access the storage device 50 to present video and/or audio to the operator. This reduces the amount of memory required in controller 40 due the large memory requirements for video.

The user interface 20 includes a visual display 62, an input device 64 and an audio output device 66. The visual display 62 may be any type of display device such as a CRT (including flat CRT's), an LCD display, etc. The input device 64 may be any type of known input peripheral such as a keyboard, mouse, track ball, etc. Alternatively, the input device 64 can be implemented in conjunction with the visual display 62 by using a touch screen which provides visual information to the operator and receives input from the operator. The audio output device 66 may include a speaker and associated components such as a sound card.

Figure 4:
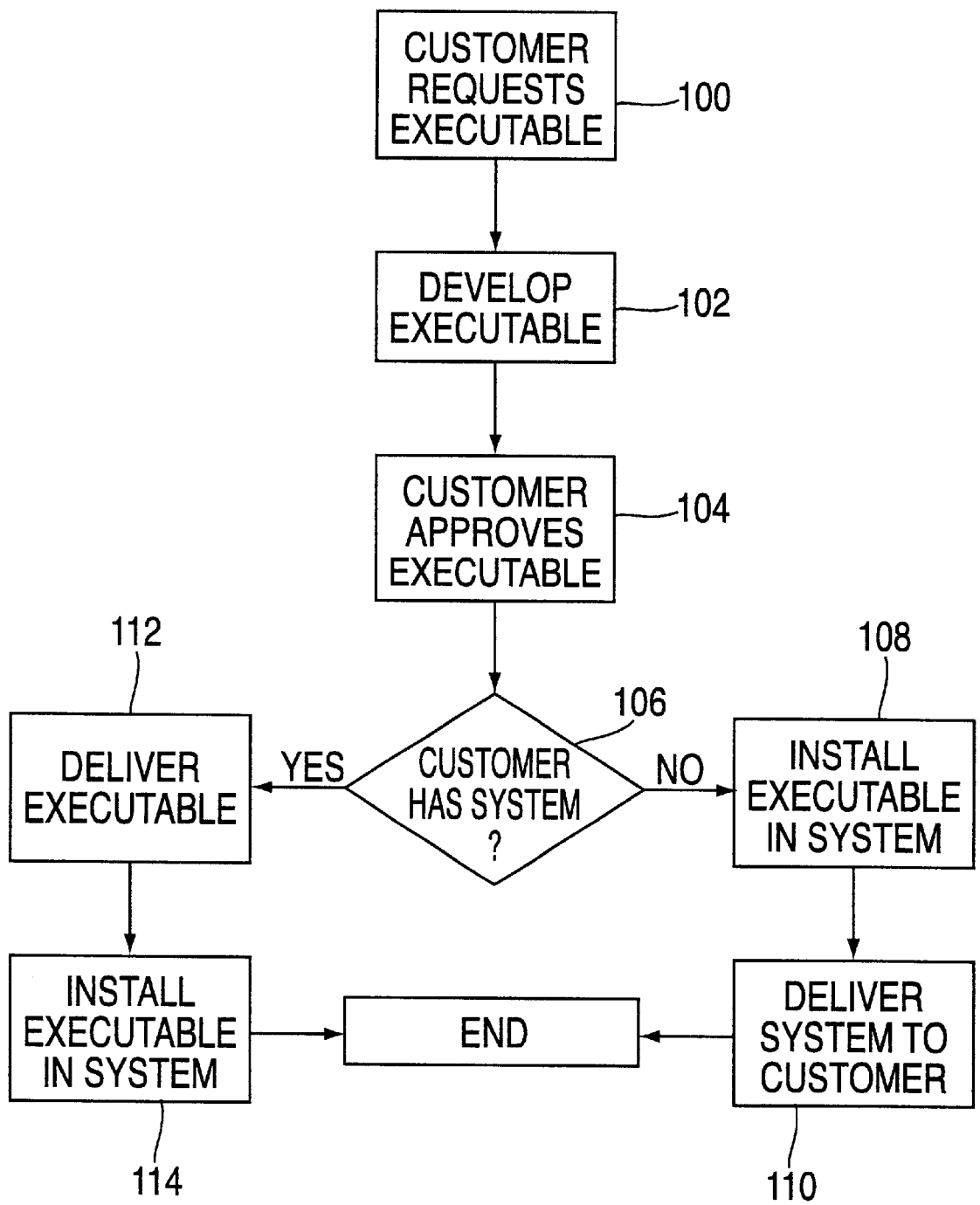
FIG. 4 is a flow chart of a process for developing and delivering an executable program.

To operate the arm through an inspection process, the controller 40 runs an executable program stored in memory 28. The controller 40 presents the operator with instructions through the user interface 20. To perform such a process, an executable program needs to be provided in the controller 40. FIG. 4 is a flow chart depicting a process for installing an executable program in a controller 40. The process begins at step 100 where a customer requests an executable program. This step may include a request for a new executable program or a request for a modification to an existing executable program. The customer may initiate a request for an executable program using known techniques such as phone, e-mail, mail, etc.

Once the provider of the executable program has received the request, the executable program is developed at step 102. The executable program provider may be the supplier of the coordinate measuring system 10 or a third party commissioned solely to generate executable programs. A variety of information may be used to create the executable program. Exemplary information includes engineering drawings (e.g., blueprints, CAD drawings, etc.) of the part to be measured. Additional information includes a description of the features of the part to be measured and a description of reference features, both provided by diagrams, sketches, digital images or a list of features. A description of the measurement environment (i.e., where the arm is to be used) may be provided through drawings, sketches or digital images. The executable program will also generate a report indicating the result of the measurement. Thus, a description of the report or a list of features contained in the report may also be used to generate the executable program. It is understood that the information used to generate the executable program will vary depending on the application of the coordinate measuring system 10.

To generate the executable program, an individual may travel to the customer's site, review the application in which the arm is to be used and develop an executable program. This may involve obtaining video, still images (e.g., from a digital camera), audio, engineering drawings and text to be used in the executable program. For example, if the coordinate measuring system is to be used to inspect an automobile panel, the executable program would be developed to present the operator with a series of images and audio instructing the operator to measure predefined points on the panel. The executable program may initiate comparison of the actual data provided by the arm 12 to reference data stored in the controller 40 to generate a report indicating whether the panel meets specification. The individual may use a portable host computer to generate the executable program at the customer's site.

Figure 5:
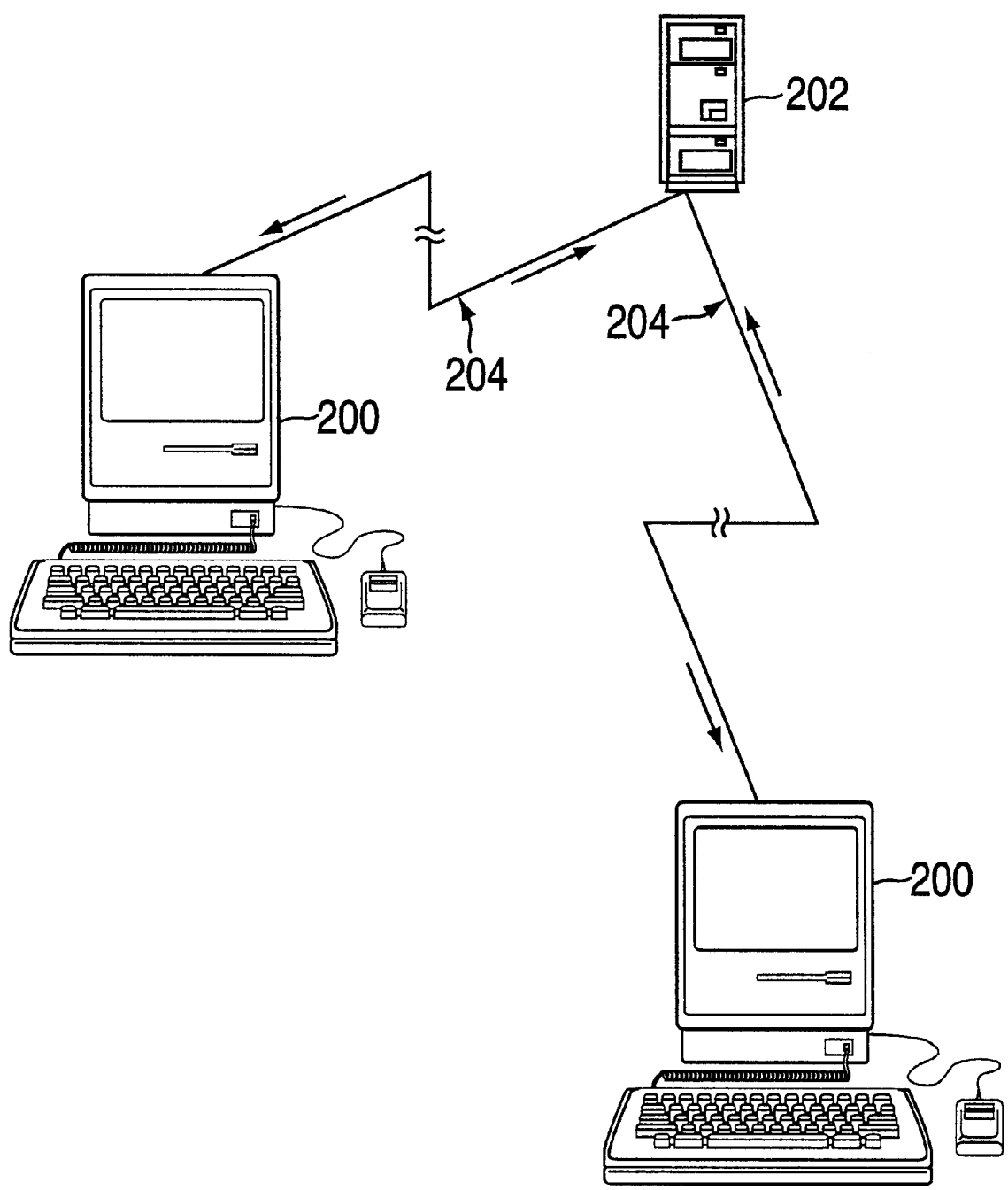
FIG. 5 is a diagrammatic view of a system for delivering an executable program.

Generation of the executable program may also be done remotely from the customer site. In this scenario, the customer will acquire the information described above and provide this information to the executable program provider. The transfer of the information may be implemented using a user system 200 coupled to an executable program provider system 202 via network 204 as shown in FIG. 5. The executable program provider will then generate the executable program based on this information and deliver the executable program to the user system 202 as described herein with reference to FIG. 5.

Once the executable program is generated, flow proceeds to step 104 where the customer views the execution of the executable program and approves the executable program. If the executable program provider is at the customer's site, the customer can view the executable using the coordinate measurement system 10 into which the executable has been loaded in memory 28. Alternatively, the executable program can be run on a general-purpose computer at the customer's site for review by the customer. If the executable program is generated at a location remote from the customer's site, the customer can review the executable program remotely via a network such as the Internet. FIG. 5 is a block diagram of a system for enabling customer request of a executable program, customer approval of an executable program and delivery of the executable program. The customer can use a user system 200 to access an executable program provider system 202 over a network 204. The user system 200 may be a general purpose computer executing a user interface application (e.g., a web browser) to contact the executable provider system 202 containing the executable program. The network 204 may be any type of network including a local area network, wide area network, intranet, Internet, etc. After verifying the customer's identity through known techniques such as user name and password, the customer can review and approve executable programs over the network 204.

Once the customer has approved the executable program, flow proceeds to step 106 where it is determined whether the customer already has a coordinate measurement system 10 at its facility. If not, flow proceeds to step 108 where the executable program is installed in a coordinate measurement system 10 and the system 10 is delivered to the customer site at step 110. If the customer has a coordinate measurement system 10 at its facility, step 106 leads to step 112 where the executable program is delivered to the customer. Delivery may occur electronically over a network or by physically delivering a storage medium (e.g., CD ROM) to the customer. The customer then installs the executable program in the controller 40 at step 114. Referring to FIG. 5, the customer can be notified by e-mail that the executable program is available. The customer then contacts the executable program provider system 202 via network 204 and downloads the executable program to user system 200. Alternatively, the executable program can be e-mailed to the customer system. Requiring the user system 200 to contact the executable program provider system 202 provides higher security given that access to the executable program can be controlled through passwords. The executable program can then be transferred to the coordinate measurement system 10 via the network interface 31, the communication device 30 or through storage device 50. Video, still images, audio and/or text may be stored in storage device 50 for access by controller 40 during execution of the executable program.

Once the executable program is installed in the controller 40, an operator may use the coordinate measurement system 10 to measure points in three-dimensional space. When the coordinate measurement system 10 is initiated, the operator is prompted to select an executable program for execution. Controller 40 may include a tutorial executable program which familiarizes the operator with operation of the arm 12. The tutorial executable program guides the operator though a series of steps in which the operator takes measurements with the arm 12. Once the operator has completed the tutorial, the operator selects an executable program and performs the steps dictated by the executable program. This may include measuring points in three-dimensional space on an object by placing a measurement portion of the arm in contact with the object. Alternatively, the measuring may include measuring a characteristic. For example, the measurement portion may include a sensor (e.g., light, oxygen, heat, etc.) and the operator is prompted to measure this characteristic at one or more locations. The term feature is used herein to generally refer to any measurable quantity such as coordinates, dimensions, characteristics, etc. A feature may also include sensed parameters such as presence of oxygen, heat, etc. Additional details regarding measurement of a feature are found in U.S. Pat. No. 5,412,880, the entire contents of which are incorporated herein by reference.

The operator may also select an experience level for the executable program. For example, the operator may be prompted to specify whether the operator is novice, intermediate or advanced with respect to the tasks to be completed in accordance with the executable program. A separate executable program can be generated for each level of operator experience. Alternatively, a portion of the executable program may be executed based on the level of operator experience. For example, a novice operator may be provided with video and sound (e.g., the operator is audibly instructed to measure the location of a bolt and is presented with a video depicting measurement of the bolt location). An intermediate operator may be provided with still images and sound (e.g., the operator is audibly instructed to measure the location of a bolt and is presented a still picture of the bolt). An advanced operator may be presented with just sound (e.g., the operator is audibly instructed to measure the location of a bolt).

Once the operator has initiated the executable program, the operator takes measurements pursuant to instructions presented on the user interface 20. As described above, the measurements may be three-dimensional coordinates of points or may be a characteristic (e.g., temperature) and a three dimensional location. As described in U.S. Pat. No. 5,978,748, the actual data produced by the arm and any sensor (if used) is compared to reference data stored in the controller 40. A report can then be generated indicating whether the actual data meets specified criteria and provide statistical information regarding the measurements. The report can be saved in memory 28 or storage device 50 for subsequent transfer to a host computer. In addition, the report can be displayed immediately to the operator at user interface 20.

In an exemplary implementation, the coordinate measurement system 10 will be rented by a customer. The controller 40 includes an expiration code in, for example, memory 28 which indicates when the rental period expires (e.g., the final day of a one year lease). Once the lease period has ended the coordinate measurement system 10 will not operate. The controller 40 may compare the current date to the date contained in the expiration code. The expiration code may be encrypted so that a customer cannot generate unauthorized expiration codes. The controller 40 notifies the customer a predetermined time period prior to expiration of the lease period that a new code should be obtained. The customer can purchase an updated expiration code over a network as shown in FIG. 5 or by phone. The updated expiration code is then stored in controller 40 enabling operation of the coordinate measurement system 10.

Figure 6:
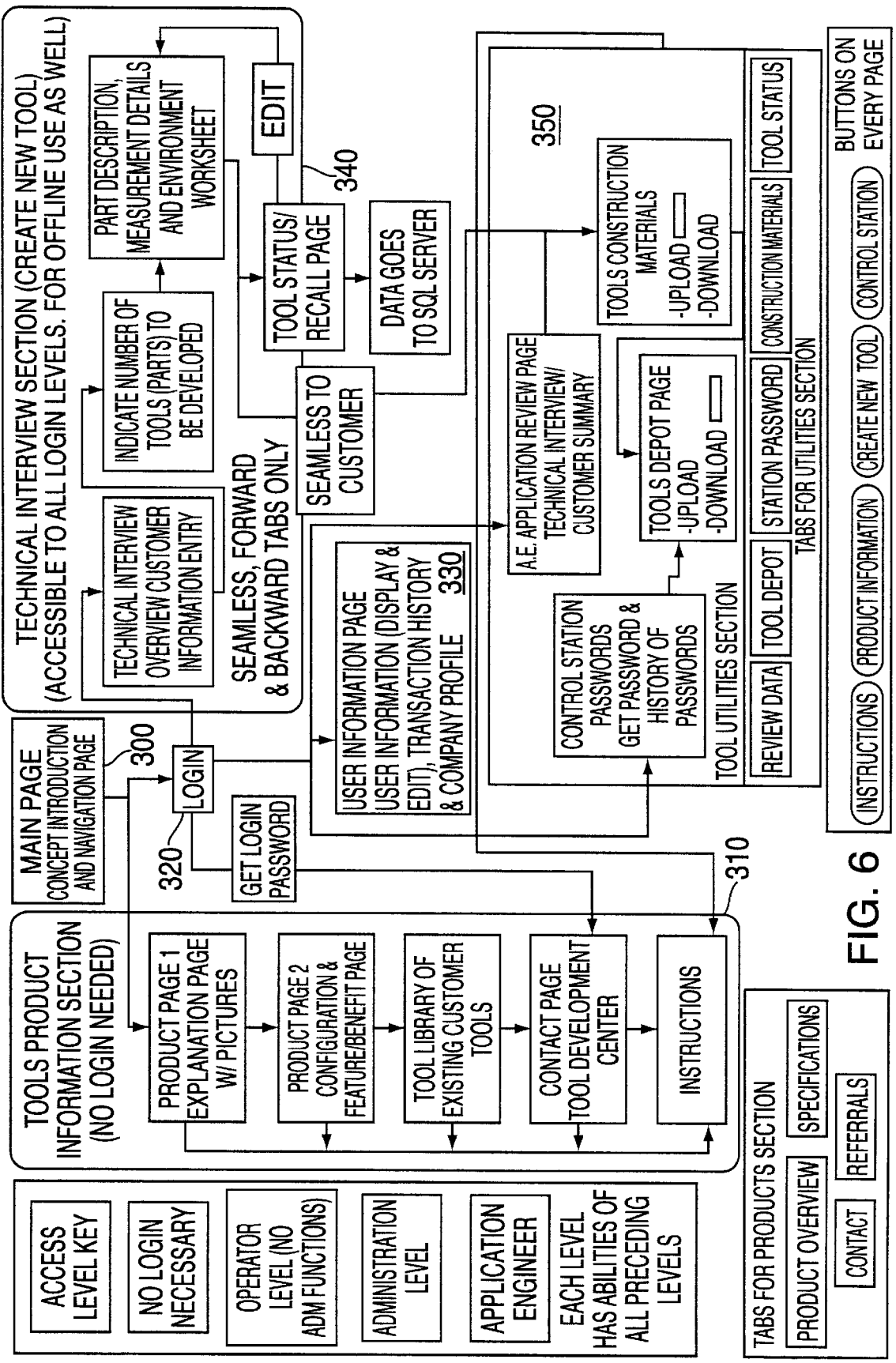
FIG. 6 is a diagrammatic view of an executable program provider web site.

As described above with respect to FIG. 5, a user system 200 can interact with a executable program provider system 202 over a network 204. In an exemplary embodiment, the executable program provider system 202 includes a server which interacts with user system 200 executing a web browser. FIG. 6 is a diagrammatic view of a web site implemented by a server in the executable program provider system 202. The web site includes a variety of "areas" in which a customer can perform certain tasks. It understood that these areas are collections of web pages (e.g., written in HTML and interpreted by a web browser). Access to areas in the web site and functions activated through the web site is controlled by assigning levels of access. Various levels of access are shown in FIG. 6 and include, in order of low to high, a visitor level (no login required), operator level (a user having a login password), administration level (a user entitled to alter aspects of the site) and applications engineer level (a user who creates/edits tools). Each level has access to all the areas and functions of the preceding level. The "user" at user system 200 may be a visitor, an operator, administrator or applications engineer. In addition, user systems 200 may be coupled to the executable program provider system 202 via different networks. For example, an operator may contact executable program provider system 202 via the Internet while an applications engineer may contact the executable program provider system 202 via an intranet.

FIG. 6 includes a main page 300 which is the first screen presented to a user system 200 upon accessing the executable program provider system 202. The executable programs are referred to as "tools" in FIG. 6 and herein. From the main screen 300, a user can view tool product information through tool product information area 310. In the tool product information area 310, a user can obtain general information about tools, view a tool library (but not access tools in the library), contact a tool developer and obtain additional information on the tools and their associated use.

Users can log in and access more features of the executable program provider system 202 through login area 320. As known in the art, a user system 200 submits a user name and password to the executable program provider system 202 over network 204 to gain access to the executable program provider system 202. The user name and password controls the level of access as described herein. The user can review their transaction history and review/edit their user information and company information through a user information area 330.

A technical interview area 340 is used to gather information relating to the executable program or tool to be generated. The user is lead through a series of questions concerning the user's application. Such questions may include a description of the features to be measured, part dimensions, part datum's, CAD data format, etc.

Once the user has defined the requirements for the new tool, the user uploads the tool description along with any associated information (CAD files, images, drawings, etc.) to the executable program provider system 202 through a tools utilities area 350. As shown in tools utility area 350, a user can upload tool construction materials to the executable program provider system 202. An executable program provider (e.g., an applications engineer or A.E.) downloads the tool construction materials from the executable program provider system 202 and creates the tool as described herein. The executable program provider then uploads the completed tool to the executable program provider system 202 and the user can then download the tool. The user can also obtain expiration codes for tools to enable functionality of the tool as described herein.

Figure 7:
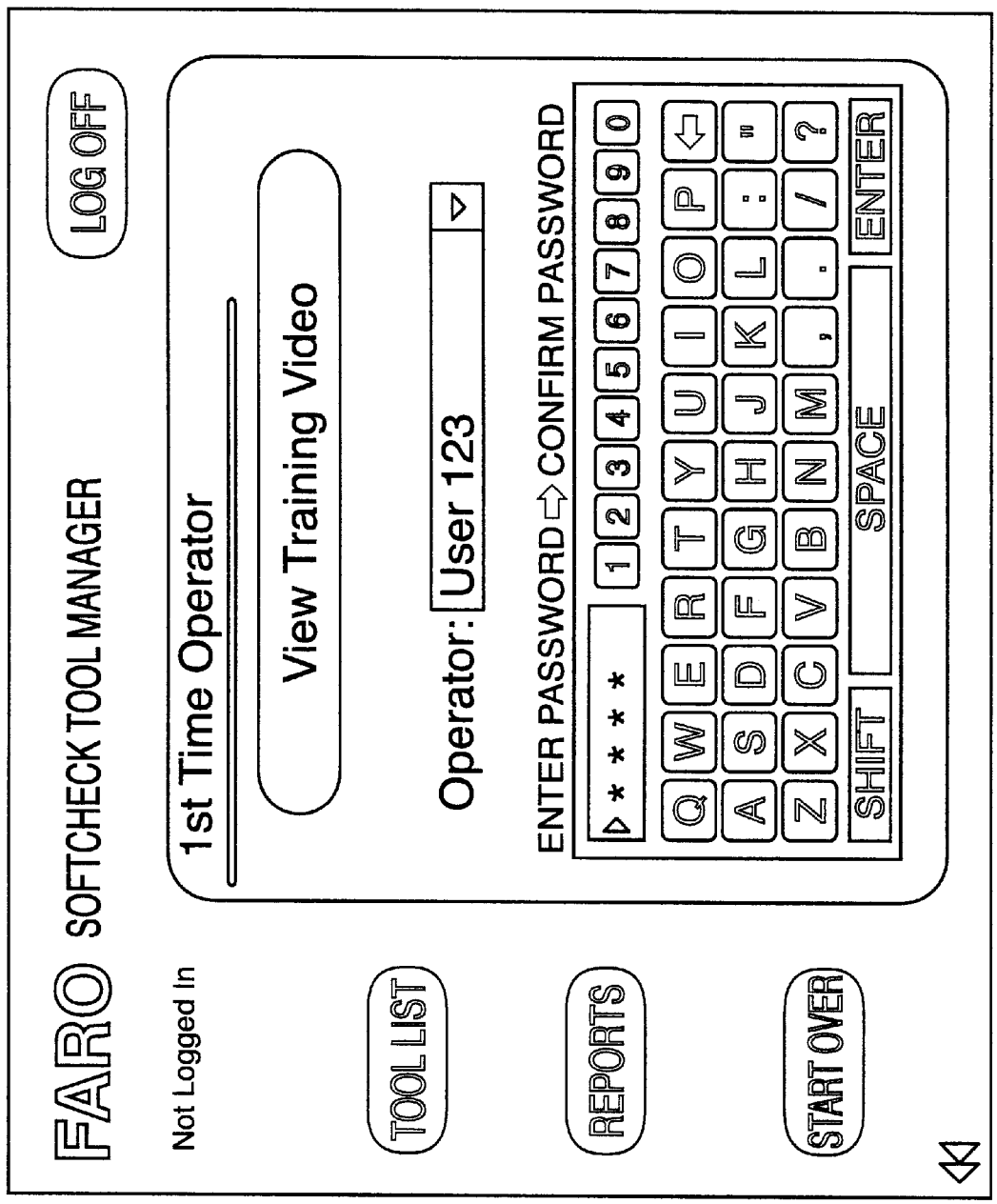
FIGS. 7–15 are exemplary user interface screens for interacting with an executable program provider system.

Once a user has a tool at its site, the tool can be saved in a storage device and executed by controller 40. FIGS. 7–15 depict exemplary screens that are presented display 20 during inspection and reporting. The interface shown in FIGS. 7–15 is a touch screen but it is understood that other input peripherals may be used such as a keyboard or mouse. A touch screen reduces the wiring and number of parts which is beneficial when the system is used in harsh environments such as production areas. FIG. 7 depicts an exemplary log in screen through which an operator selects an operator identifier through a drop down menu and enters a password.

Figure 8:
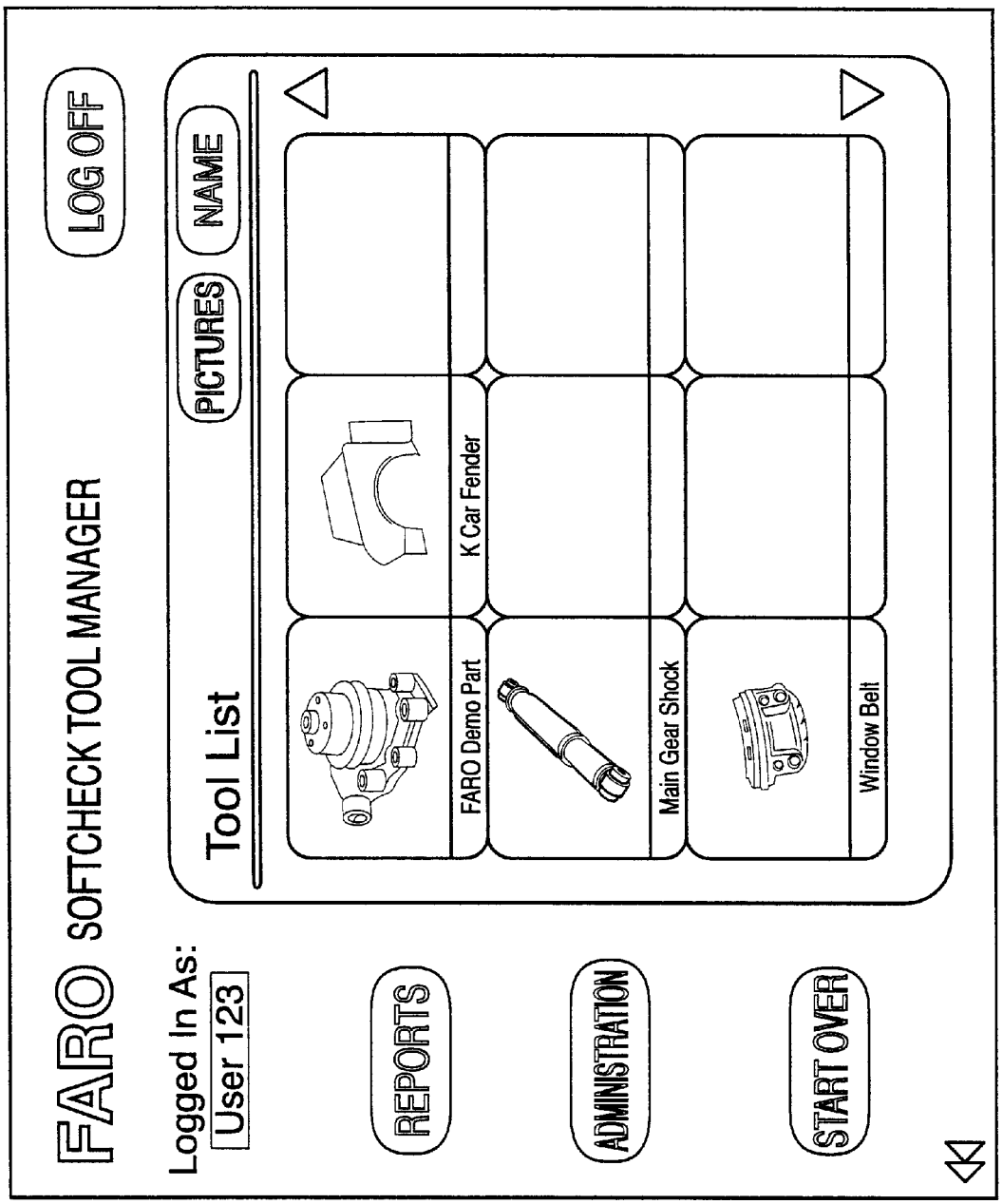
Figure 9:

Once the operator logs in, the operator needs to select a tool or executable program for execution. The tool may guide the operator through an inspection procedure. FIGS. 8 and 9 present alternative tool selection screens in which tools are listed in different fashions. The operator selects a tool for execution from the list of tools. The list of tools presented to the operator may be controlled based on an operator identifier as described herein. For example, if the operator will be inspecting fenders for compliance with design specifications, the user selects the fender tool. Once a tool is selected, the operator is prompted to enter a serial number for the part to be inspected. In this way, measurements taken are associated with a particular part.

Figure 10:
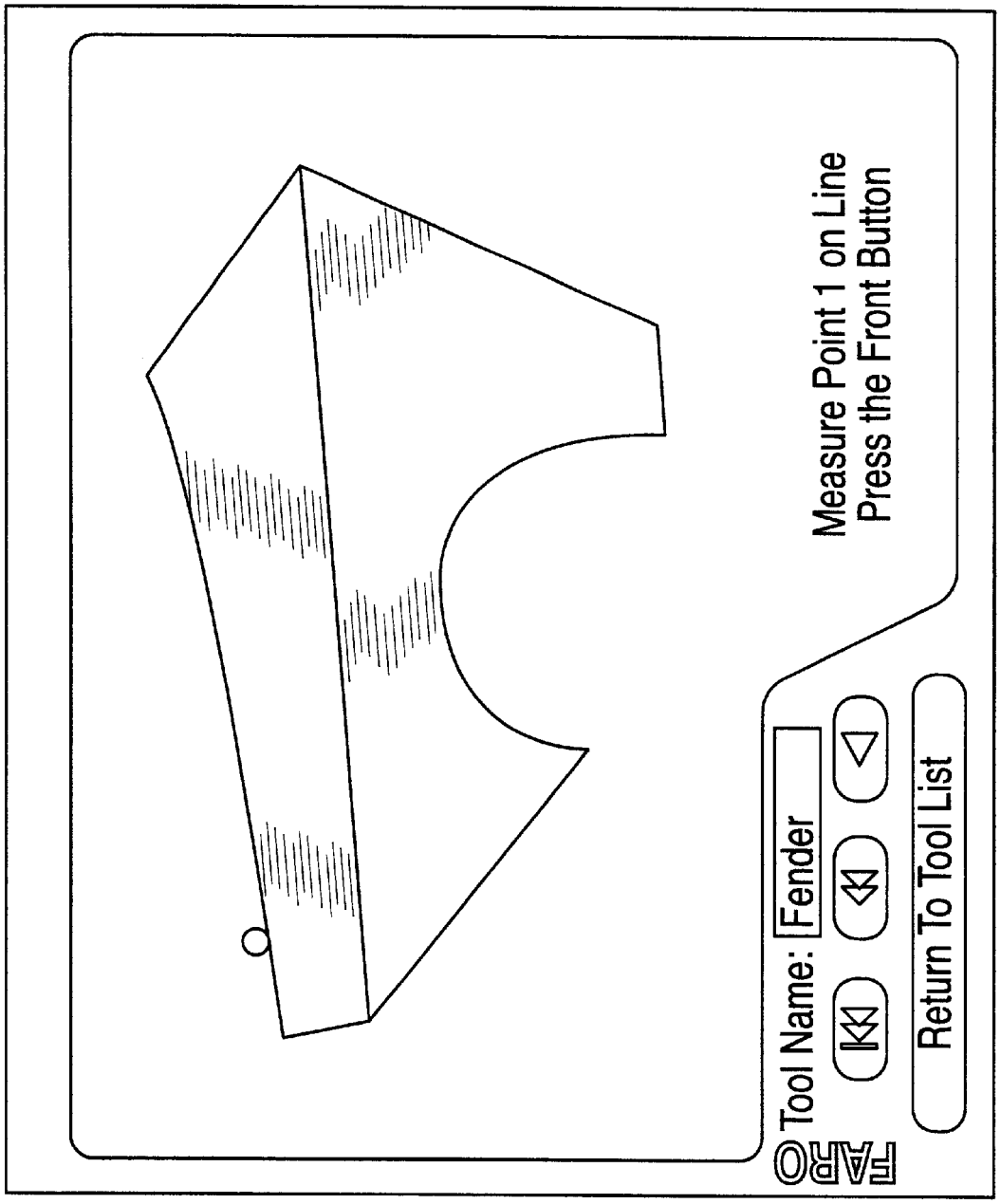
Figure 11:
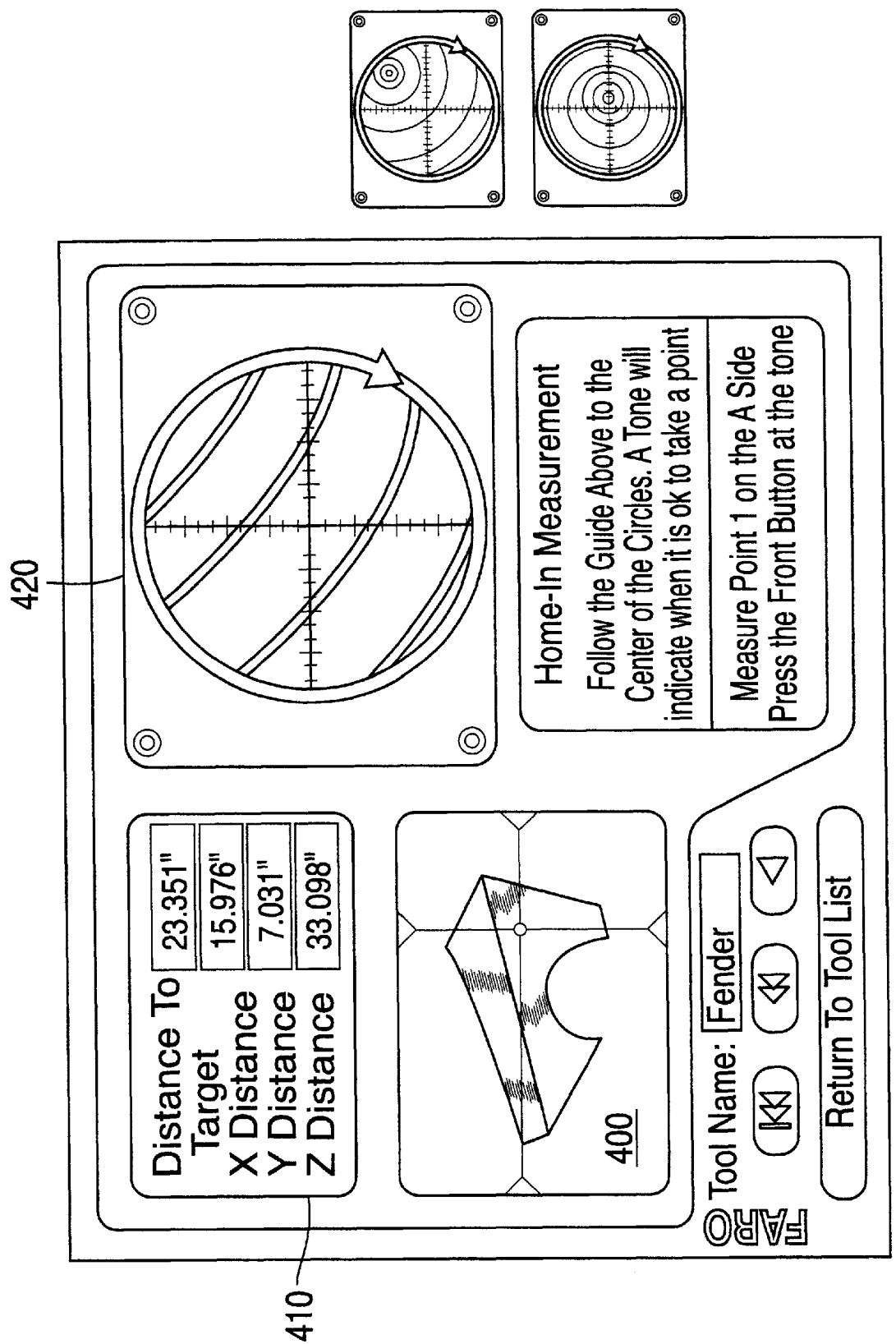

Once the part serial number is entered, the part can then be inspected. FIG. 10 is an exemplary part measurement screen which provides the operator with instructions on what features are to be measured on the part. For example, the user may be prompted to measure three points to determine if the three points lie in a plane within a required tolerance. To facilitate taking measurements, the tool includes a home-in feature that guides the operator to the point to be measured with arm 12. FIG. 11 is an exemplary home-in screen. Part of the process of measuring a part is aligning the part to the arm coordinate system. This may include placing the part in a test fixture which is aligned with the arm or measuring datums on the part. The user is presented with several measurement indicators aids to facilitate measurement at a point on the part. First is a visual depiction 400 of the part and the location of the point to be measured. Second is the distance to the point 410 provided in total distance and distance for each axis (x, y, z) of the coordinate system. Lastly, a home-in guide 420 is provided that includes concentric rings indicating the position of the measurement location. As the operator moves the measurement end of the arm 12 towards the measurement location, the background of the home-in guide 420 changes as shown in FIG. 11. In addition to the home-in rings changing appearance, the color of the home-in guide may change (e.g., to green) and an audible tone may be produced when the measurement location is reached. These indicators prompt the operator to perform the measurement. The measured features are stored in a database, for example in storage device 50, accusable by controller 40.

Figure 12:
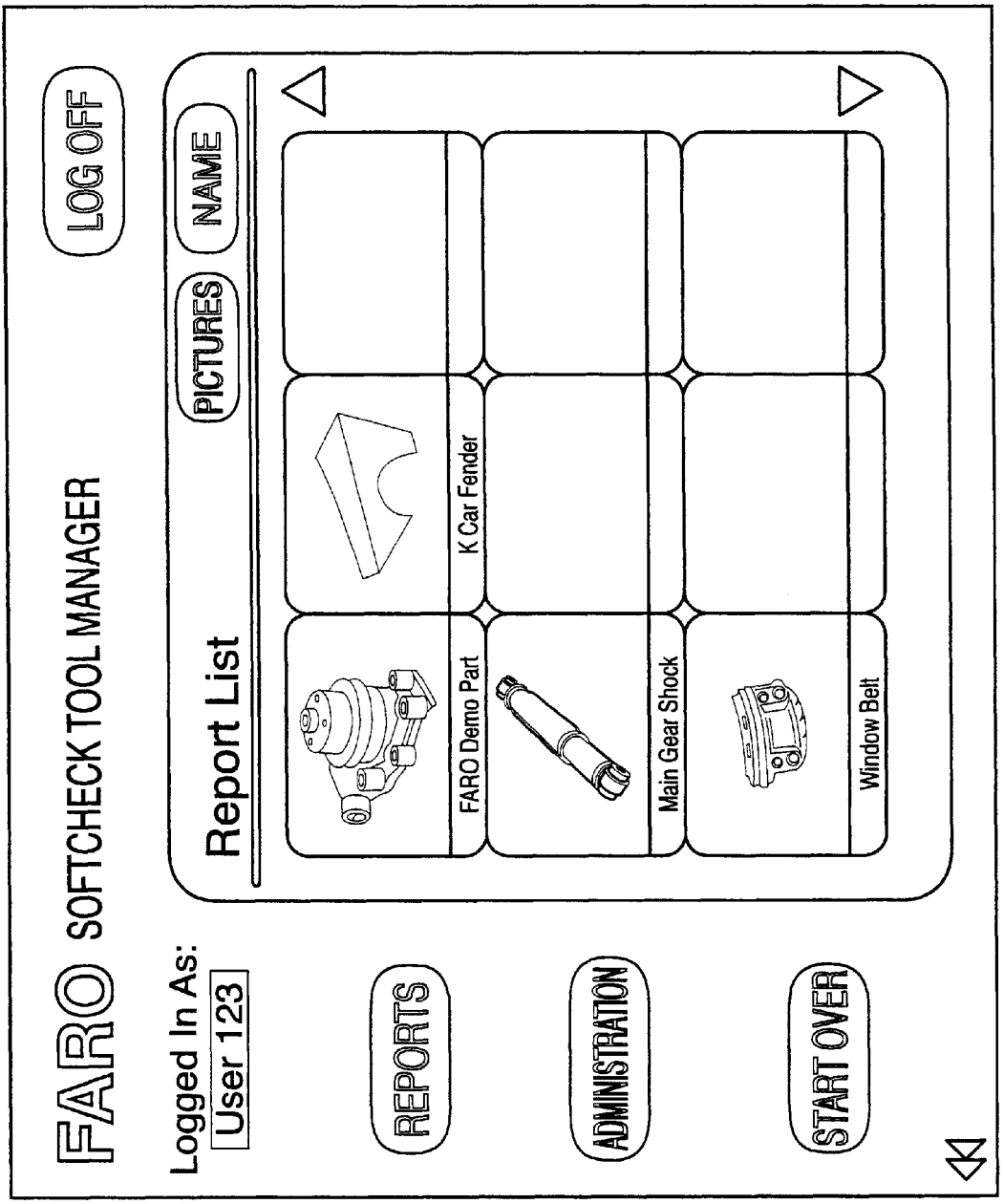
Figure 13:
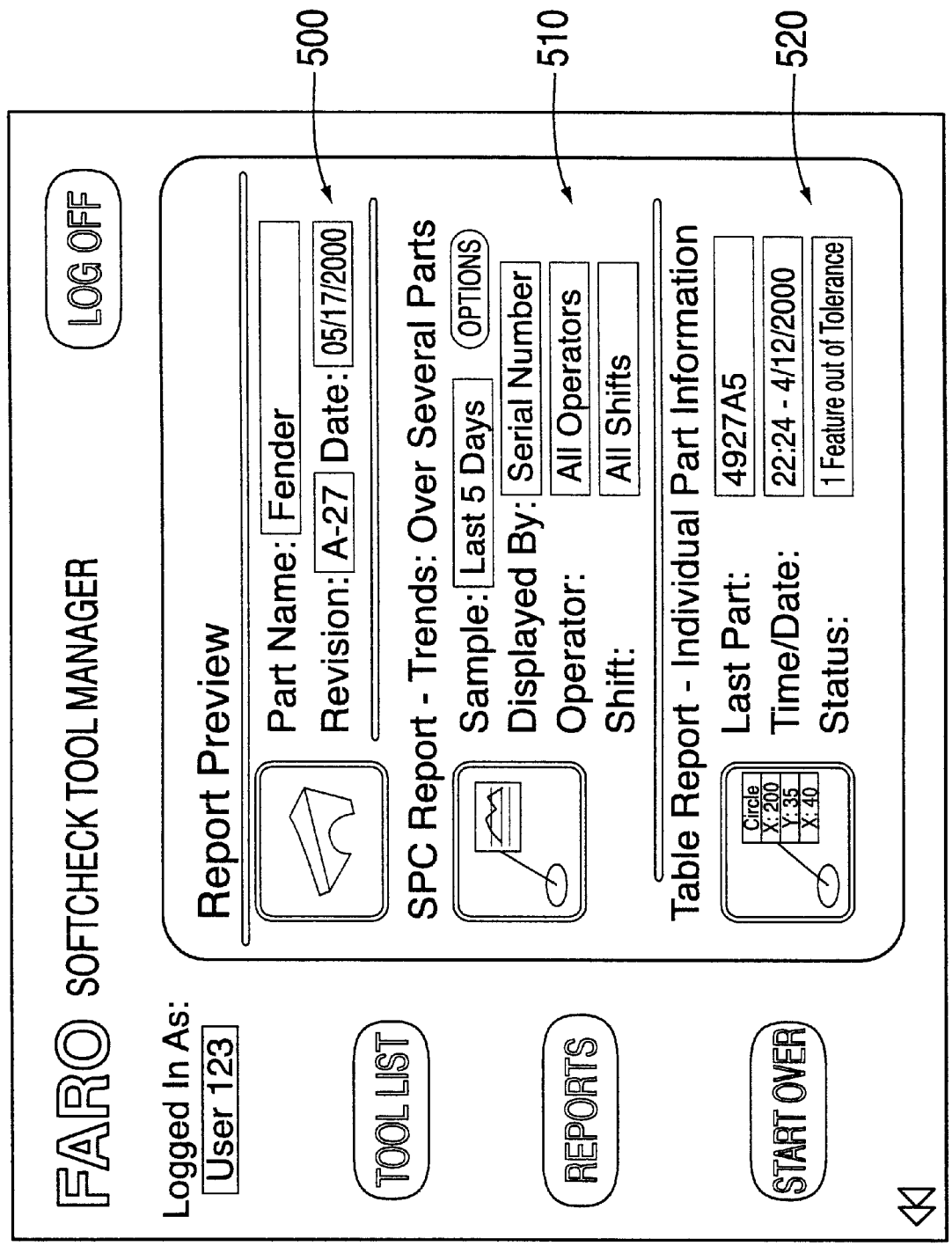

Once measurements have been taken, a number of reports can be generated. FIG. 12 is an exemplary report screen through which an operator can select a tool for which to view reports. The tools may be displayed pictorially as shown in FIG. 12 or by name similar to that shown in FIG. 9. Once the user selects a tool in FIG. 12, a report preview screen is provided as shown in FIG. 13. The report preview screen includes a description 500 of the part inspected, a statistical process control (SPC) report window 510 and a table report window 520. Through the SPC report window 510, the operator can specify parameters for the SPC report including the number of samples (e.g., last 5 days measurements), how to display measurements, which operator's measurements to include and which shift's measurements to include. Through the table report window 520, users can specify tabular report data for a specific part by entering a part number.

Figure 14:
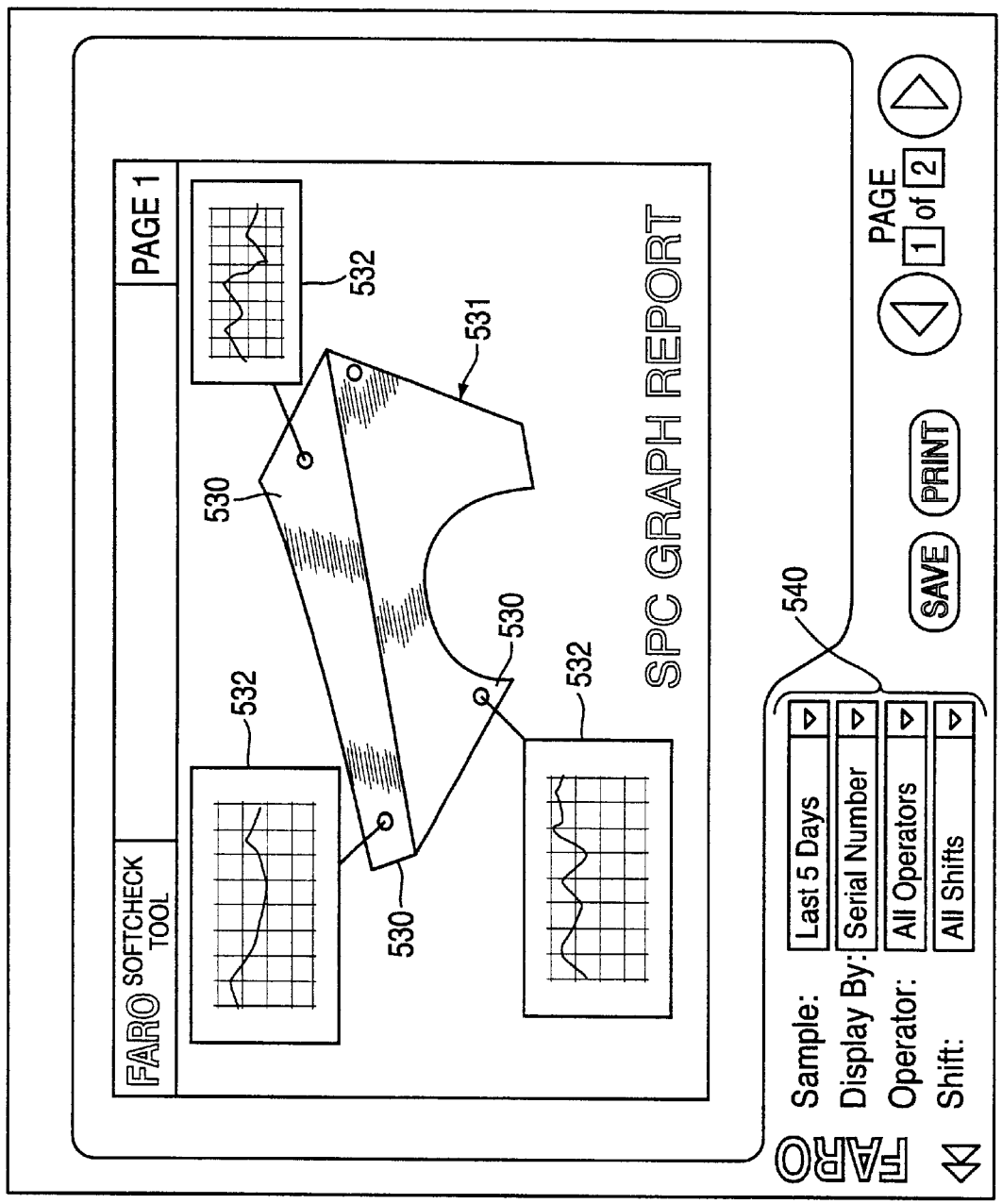

Selecting an SPC report icon in the SPC report window 510 provides the user with an SPC report such as that shown in FIG. 14. An SPC report 532 may be generated for each feature measured on a plurality of parts to detect trends. A representation of the measurement location 530 for the measured feature is shown on the image 531 of the part. The SPC report 532 is displayed adjacent to the image 531 of the part and is positioned proximate to the representation of the measurement location. Report parameters may be changed through drop down menus 540. The SPC report may include high limits, low limits and a plot of prior measurements for a feature. The feature may be a dimension (a diameter of a hole) or a characteristic (e.g., circularity of a hole, planarity of a surface). The SPC reports can be enlarged to a full screen display by selecting the report. The SPC report allows a user to view trends in measurements which may require corrective action.

Figure 15:
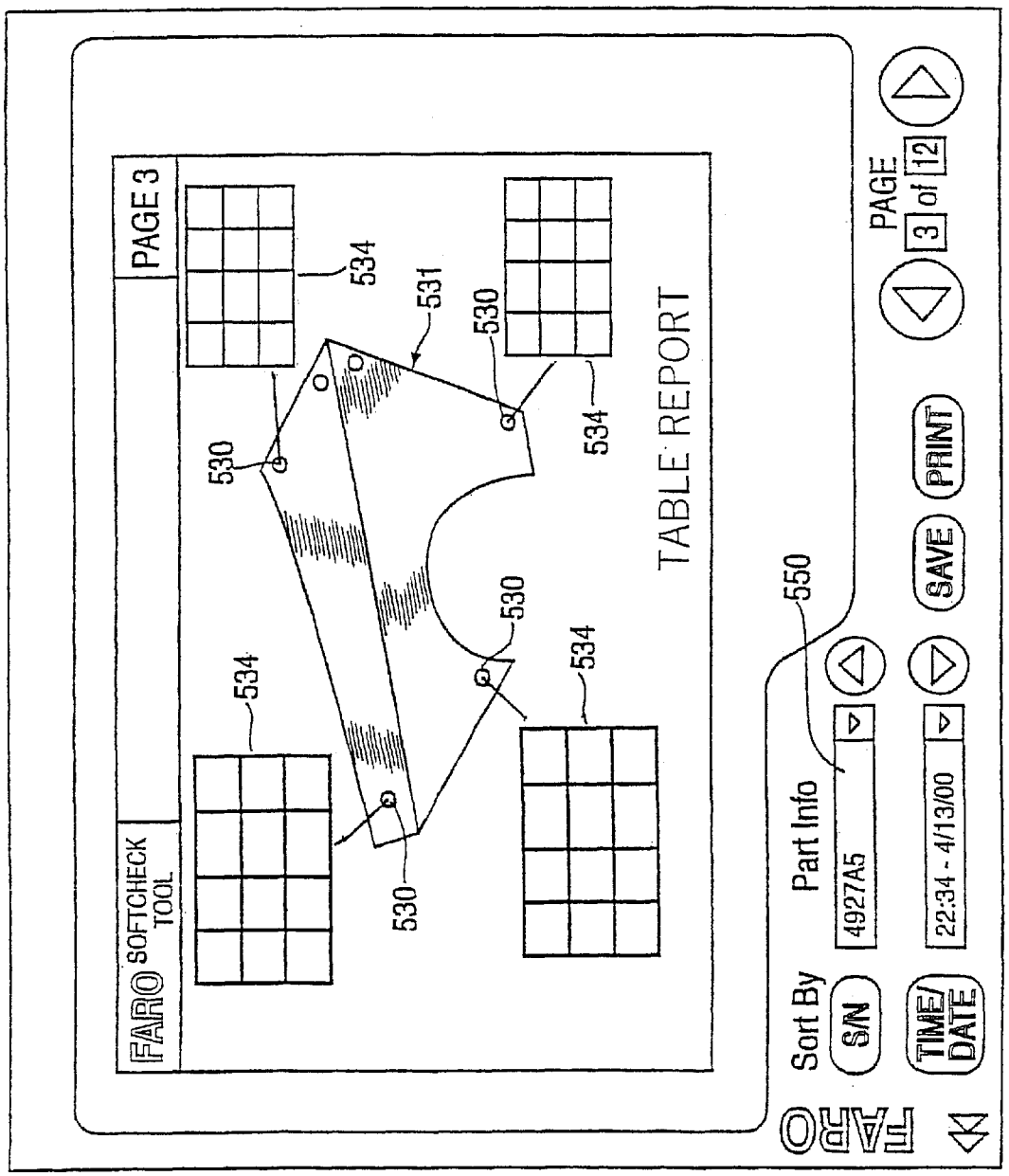

Selecting a table report icon in the table report window 520 provides the user with a tabular report such as that shown in FIG. 15. The tabular report 534 may be generated for each feature measured on a single part. A representation of the measurement location 530 for the measured feature is shown on the image 531 of the part. The tabular report 534 is displayed adjacent to the image of the part and is positioned proximate to the representation of the measurement location 530. The user can change the part number through part number field 550. The tabular report for each feature provides the feature specified value, tolerance, feature measured value and an indicator of whether the measured feature is out of specification. The feature may be a dimension (a diameter of a hole) or a characteristic (e.g., circularity of a hole). The table reports 534 can be enlarged to a full screen display by selecting the report.

Execution of the report functions is not limited to controller 40 associated with arm 12. The measurement data in storage device 50 may be accessed by other systems distanced from the inspection area (e.g., factory floor). For example, the storage device 50 may be accessible via a company intranet through personal computers. A personal computer can execute the reporting software application used to generate reports based on the measurement data. For example, a manufacturing engineer remote from the factory floor can generate SPC reports based on measurement data in storage device 50 to evaluate and adjust a manufacturing process accordingly.

Figure 16:
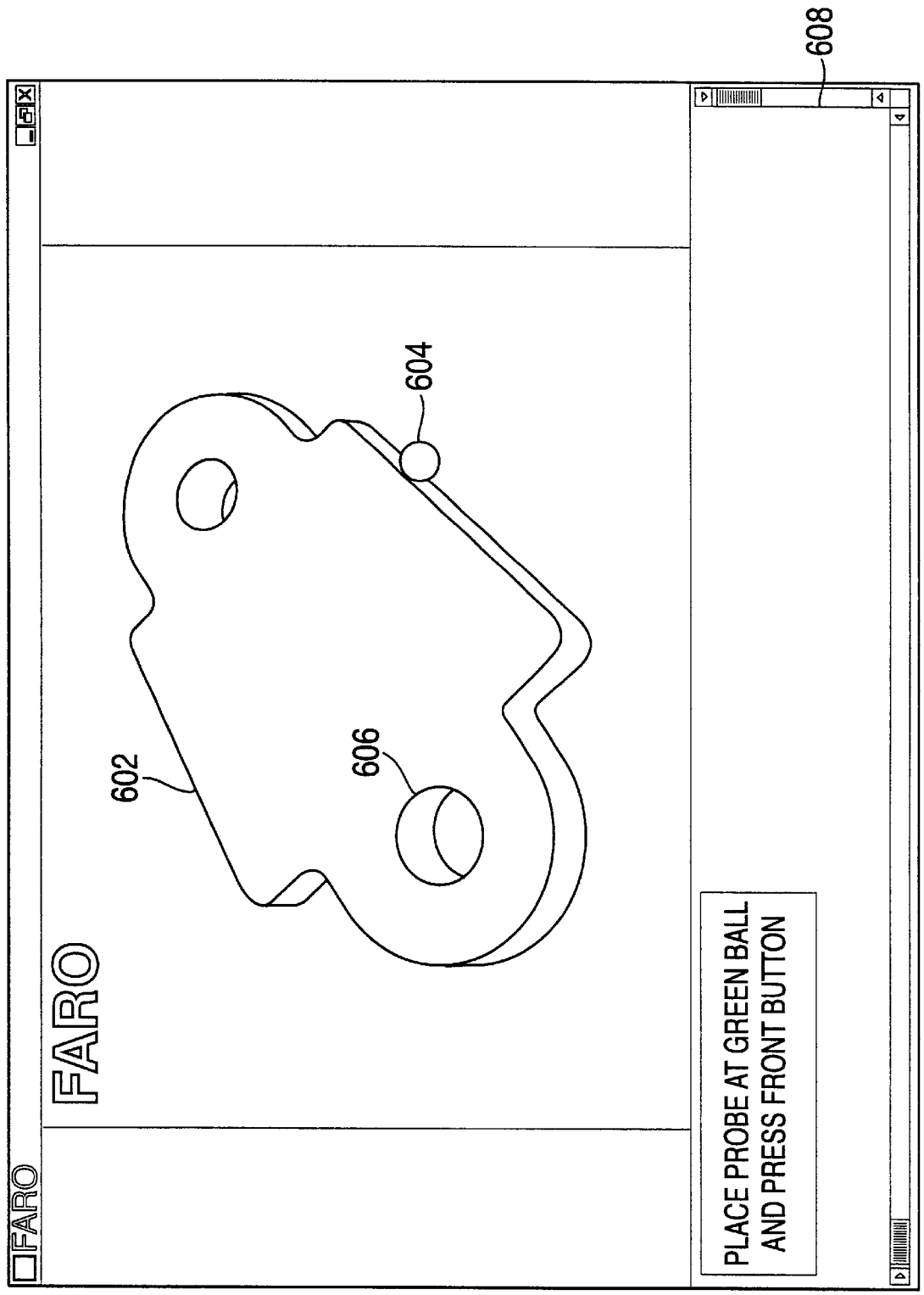
FIG. 16 depicts an exemplary user interface screen for measuring a feature of a part.

FIG. 16 depicts another measurement user interface which directs an operator through the measurement of a part. As shown in FIG. 16, the part 602 is depicted to the operator using a digital image such as a digital bitmap. The bitmap accurately portrays the surface of the part through shading, etc. This is preferable to conventional measurement systems that display parts as CAD wireframes. CAD wireframes are difficult to read and it is often hard for the operator to determine on what surface the measurement point lies due to the transparent nature of wireframes.

The measurement interface also includes an alternate measurement indicator 604. The measurement indicator 604 directs the operator to the proper location on the physical part for measurement. The measurement indicator 604 is also a three-dimensional object such as a colored (e.g., green) ball and can be positioned in any position with respect to the part 602. The part 602 may have an exterior surface and one or more interior surfaces. Thus, the measurement indicator 604 can be placed adjacent to or on an interior surface of the part 602. For example, to measure the interior circularity of hole 606, the measurement indicator 604 is displayed within the hole 606 along multiple positions on the interior surface of hole 606. This accurately directs the operator to measurement positions on the physical part. An instruction window 608 also provides measurement instructions to the operator.

Figure 17:
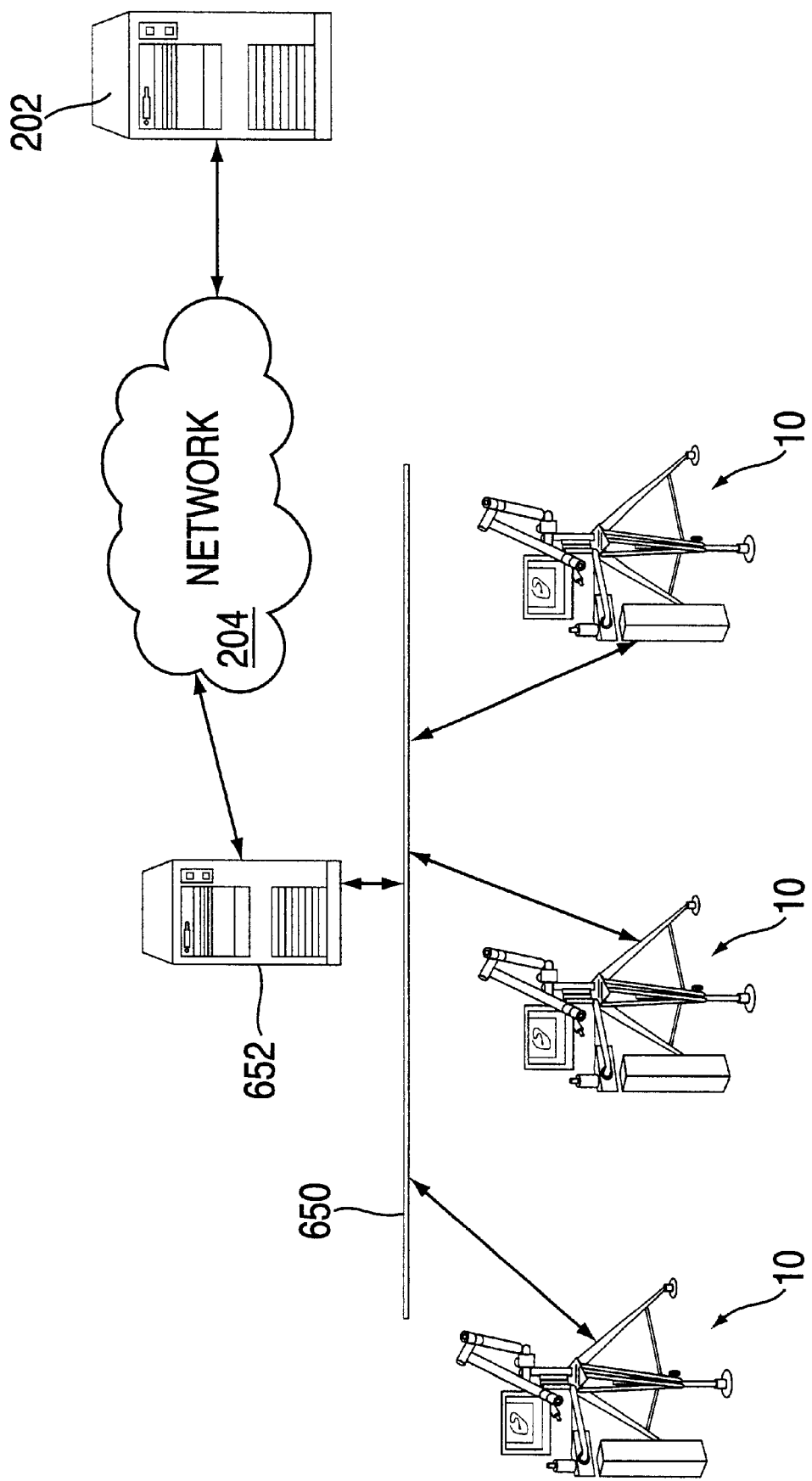
FIG. 17 depicts a number of coordinate measurement systems coupled to a network.

FIG. 17 depicts a number of coordinate measurement systems 10 or control stations coupled to a network 650. As described above with reference to FIG. 3, the coordinate measurement systems 10 include a network interface 31 that allows the coordinate measurement system 10 to communicate over a network. In an exemplary embodiment, network 650 is a local area network. The coordinate measurement system 10 may be connected to network 650 in a wireless manner.

A server 652 is also connected to the network 650 and provides for storage of executable programs. The server 652 may store executable programs for an entire facility. An operator can log onto a coordinate measurement system 10 and be presented with a list of executable programs authorized for that operator. The server 652 controls access to executable programs through the operator's identifier (e.g., user identification and password). For example, a database accessed by server 650 correlates operator's identifiers with executable programs. Only executable programs associated with the operator identifier may be transferred to the requesting coordinate measurement system 10. Through this mechanism, operator access to executable program is controlled.

Each coordinate measurement system 10 may also be identified by a unique coordinate measurement system identifier (e.g., serial number) which is accessible by server 652. When an operator logs in through a coordinate measurement system 10 and requests an executable program from server 652, the server 652 compares the coordinate measurement system identifier to a database correlating coordinate measurement system identifiers to executable programs. Only executable programs associated with the coordinate measurement system identifier may be transferred to the coordinate measurement system 10.

The executable program can then be transferred to controller 40 in the coordinate measurement system 10 for execution. This architecture is helpful in managing executable programs. As described above with reference to FIG. 5, server 652 can retrieve executable programs from an executable program provider 202 over a network 204. Having the executable programs stored in a central location, such as server 650, ensures revision control of the executable programs. Thus, an update to an executable program is stored in server 652 which can then be retrieved by coordinate measurement system 10.

In another embodiment of the invention, the user of the coordinate measurement system 10 can generate executable programs using an executable toolkit provided by the executable program provider. The executable toolkit is a software application that allows a user to generate executable programs without having to contact the executable program provider.

In a preferred embodiment, the executable toolkit is provided to a user and licensed for use in generating executable programs for a single facility. For example, an executable toolkit may be licensed to an auto manufacturer for developing executable programs for a single factory. The license would not allow the user to generate executable programs for multiple sites. To ensure compliance with the license terms, each coordinate measurement system 10 can be programmed with an unalterable, site identifier prior to shipment to the user. The site identifier may be stored in read only, non-volatile memory in controller 40. Similarly, the executable toolkit includes a software routine that inserts an executable program site identifier in each executable program generated using the executable toolkit. When a coordinate measurement system 10 accesses an executable program for execution, the coordinate measurement system site identifier in the coordinate measurement system 10 is compared with the executable program site identifier. If these identifiers do no match, execution of the executable program by the coordinate measurement system 10 is prevented. Thus, executable programs generated at a first site cannot be executed by coordinate measurement system 10 at a second site.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of providing an executable program from an executable program provider to a customer for use in a controller of a three dimensional coordinate measurement system, the method comprising:

receiving a request to create an executable program from a customer;

obtaining information related to the executable program, the information including a customer description of at least one feature of a part to be measured with the coordinate measurement system;

developing the executable program in response to the information, the executable program guiding an operator through a number of measurement steps to be performed with the three dimensional coordinate measuring system to measure the at least one feature; and, delivering the executable program to the customer.

2. The method of claim 1 wherein delivering the executable program is performed over a network.

3. The method of claim 2 wherein:

wherein the network is the Internet.

4. The method of claim 2 wherein:

the request to create an executable program is received over the network.

5. The method of claim 1 wherein:

the executable program prompts the operator for an experience level; and the executable program generates varying content in response to the experience level.

6. The method of claim 1 further comprising:

providing an expiration code to the customer for installation in the controller, the expiration code enabling operation of the coordinate measurement system for a predetermined period of time.

7. The method of claim 6 further comprising:
receiving a request from the customer for an updated expiration code;
providing art updated expiration code to the customer.

8. The method of claim 7 wherein:
the updated expiration code is provided to the customer over a network.

9. The method of claim 7 wherein:
the request for an updated expiration code is provided to the executable program provider over the network.

10. The method of claim 1 further comprising:
allowing the customer to view execution of the executable program over a network; and
obtaining a customer approval of the executable to am over the network.

11. The method of claim 1 wherein:
obtaining information related to the executable program includes obtaining engineering drawings of a part to be measured.

12. The method of claim 1 wherein:
obtaining information related to the executable program includes obtaining a description of features of a part to be measured.

13. The method of claim 1 wherein:
obtaining information related to the executable program includes obtaining a description of reference features of a part to be measured.

14. The method of claim 1 wherein:
obtaining information related to the executable program includes obtaining a description of the measurement environment.

15. The method of claim 1 wherein:
obtaining information related to the executable program includes obtaining a a description of a report to be generated by the executable program.

16. The method of claim 1 wherein:
the executable program provides an inspection procedure to an operator of the coordinate measurement system having a display, the executable program implementing a process comprising:
prompting the operator to select an experience level;
selecting one of a plurality of executable programs in response to the experience level to define a selected executable program; and,
executing the selected executable program,
wherein for a first experience level, the selected executable program consists essentially of audio and video to direct the operator through the inspection procedure.

17. The method of claim 16 wherein for a second experience level, the selected executable program consists essentially of audio and still images to direct the operator through the inspection procedure.

18. The method of claim 17 wherein for a third experience level, the selected executable program consists essentially of audio to direct the operator through the inspection procedure.

19. The method of claim 1 wherein the executable program directs an operator through an inspection procedure including measuring a feature at a measurement location on the part using the coordinate measurement system including a display, comprising:
presenting to the operator through the display a digital image of the part and a measurement indicator, the measurement indicator directing the operator to position a measurement portion of the coordinate measurement system adjacent the measurement location on the part.

20. The method of claim 19 wherein the measurement indicator is positioned relative to the digital image of the part, the measurement indicator being positioned on an interior surface of the digital image of the part.

21. The method of claim 20 wherein the measurement indicator is a colored indicator.

22. The method of claim 19 wherein the measurement indicator is a home-in guide, the home-in guide including a display window that changes appearance as the measurement portion approaches the measurement location.

23. The method of claim 22 wherein the home-in guide includes concentric rings indicating the position of the measurement location.

24. The method of claim 22 wherein the home-in guide changes appearance as the measurement portion approaches the measurement location.

25. The method of claim 1 wherein the executable program provides reporting results of a measurement process, comprising:
measuring a feature of a part at a measurement location on the part;
displaying an image of the part, the image of the part including a representation of the measurement location; and
displaying adjacent to the image of the part an indication of the feature, the indication of the feature being positioned proximate to the representation of the measurement location.

26. The method of claim 25 wherein the feature includes a three dimensional coordinate.

27. The method of claim 25 wherein the feature is circularity.

28. The method of claim 25 wherein the feature is planarity.

29. The method of claim 25 wherein the indication of the feature is a table of measurements performed for the measurement location over a predetermined time.

30. The method of claim 25 wherein the indication of the feature is a statistical process control graph depicting variance of the feature over time.

31. The method of claim 1 further comprising:
storing a plurality of executable programs on a server, the executable programs guiding an operator through a number of measurement steps to be performed with the coordinate measurement system;
receiving a request at the server from the coordinate measurement system for delivery of an executable program, the request including an operator identifier identifying the operator using the coordinate measurement system, the server restricting access or providing access to at least one executable program based on the operator identifier; and
the server delivering the executable program to the coordinate measurement system if access is available to the operator.

32. The method of claim 1 further comprising:
storing a plurality of executable programs on a server, the executable programs guiding an operator through a number of measurement steps to be performed with the coordinate measurement system;
receiving a request at the server from the coordinate measurement system for delivery of an executable program, the request including a coordinate measurement system identifier identifying the coordinate measurement system requesting the executable program, the server restricting access or providing access to at least one executable program based on the coordinate measurement system identifier; and the server delivering the executable program to the coordinate measurement system if access is available to the coordinate measurement system.

33. The method of claim 1 further comprising:

providing an executable program toolkit, the executable program toolkit generating an executable program for execution by the coordinate measurement system, the executable program toolkit inserting a site identifier in an executable program generated using the executable program toolkit;

the coordinate measurement system including a coordinate measurement system site identifier;

wherein the coordinate measurement system executes the executable program in response to a comparison of the executable program site identifier and the coordinate measurement system site identifier.

34. The method of claim 33 wherein the coordinate measurement system compares the executable program site identifier and the coordinate measurement system site identifier.

35. The method of claim 1 wherein:

the three dimensional coordinate measuring system is portable.

36. The method of claim 1 wherein:

the three dimensional coordinate measuring system includes an articulated arm.

37. The method of claim 1 wherein:

the feature to be measured is a dimensional feature.

38. A system for providing an executable program from an executable program provider to a customer for use in a controller of a three dimensional coordinate measurement system, the system comprising:

an executable program provider system coupled to a customer system by a network, the executable program provider system receiving a request to create an executable program and receiving incarnation related to the executable program from the customer system, the information including a description of at least one feature of a part to be measured with the coordinate measurement system;

the executable program provider system submitting the executable program to the customer system over the network.

39. The system of claim 38 wherein:

wherein the network is the Internet.

40. The system of claim 38 wherein:

the request to create an executable program is received over the network.

41. The system of claim 38 wherein:

the executable program prompts the operator for an experience level; and the executable program generates varying content in response to the experience.

42. The system of claim 38 wherein:

the executable program provider system provides an expiration code to the customer system for installation in the controller, the expiration code enabling operation of the coordinate measurement system car a predetermined period of time.

43. Tho system of claim 42 wherein:

the executable program provider system receives a request from the customer system for an updated expiration code; and, the executable program provider system provides an updated expiration code to the customer system.

44. Tho system of clam 43 wherein:

the updated expiration code is provided to the customer system over the network.

45. The system of claim 43 wherein:

the request for an updated expiration code is provided to the executable program provider system over the network.

46. The system of claim 38 wherein:

the executable program provider system provides allows the customer system to view execution of the executable program over the network; and the executable program provider system receives approval of the executable program from the customer system over the network.

47. The system of claim 38 wherein:

obtaining information related to the executable program includes obtaining engineering drawings of a part to be measured.

48. The system of claim 38 wherein:

obtaining information related to the executable program includes obtaining a description of features of a part to be measured.

49. The system of claim 38 wherein:

obtaining information related to the executable program includes obtaining a description of reference features of a part to be measured.

50. The system of claim 38 wherein:

obtaining information related to the executable program includes obtaining a description of the measurement environment.

51. The system of claim 38 wherein:

obtaining information related to the executable program includes obtaining a a description of a report to be generated by the executable program.

52. The system of claim 38 wherein, the coordinate measurement system provides an inspection procedure to an operator, the coordinate measurement system comprising:

a controller for prompting the operator to select an experience level;

the controller selecting one of a plurality of executable programs in response to the experience level to define a selected executable program; and, the controller executing the selected executable program, wherein for a first experience level, the selected executable program consists essentially of audio and video to direct the operator through the inspection procedure.

53. The coordinate measurement system of claim 52 wherein for a second experience level, the selected executable program consists essentially of audio and still images to direct the operator through the inspection procedure.

54. The coordinate measurement system of claim 53 wherein for a third experience level, the selected executable program consists essentially of audio to direct the operator through the inspection procedure.

55. The system of claim 38 wherein the coordinate measurement system comprises:

a measurement portion to measure a feature associated with the part;

a controller executing an executable program directing the operator through a procedure;

a display coupled to the controller, the display presenting a digital image of the part and a measurement indicator, the measurement indicator directing the operator to position the measurement portion adjacent a measurement location on the part.

56. The coordinate measurement system of claim 55 wherein the measurement indicator is positioned relative to the digital image of the part, the measurement indicator being positioned on an interior surface of the digital image of the part.

57. The coordinate measurement system of claim 56 wherein the measurement indicator is a colored indicator.

58. The coordinate measurement system of claim 55 wherein the measurement indicator is a home-in guide, the home-in guide including a display window that changes appearance as the measurement portion approaches the measurement location.

59. The coordinate measurement system of claim 58 wherein the home-in guide includes concentric rings indicating the position of the measurement location.

60. The coordinate measurement system of claim 58 wherein the home-in guide changes appearance as the measurement portion approaches the measurement location.

61. The system of claim 38 wherein the coordinate measurement system comprises:

a measurement portion for measuring a feature of a pad at a measurement location on the part;

a controller receiving the measurement of the feature; and a display coupled to the controller, the display displaying an image of the part, the image of the part including a representation of the measurement location;

the displaying adjacent to the image of the part an indication of the feature, the indication of the feature being positioned proximate to the representation of the measurement location.

62. A The system of claim 61 wherein the feature includes a three dimensional coordinate.

63. The system of claim 61 wherein the feature is circularity.

64. The system of claim 61 wherein the feature is planarity.

65. The system of claim 61 wherein the indication or the feature is a table of measurements performed for the measurement location over a predetermined time.

66. The system of claim 61 wherein the indication of the feature is a statistical process control graph depicting variance of the feature over time.

67. The system of claim 38 further comprising:

the coordinate measurement system including a measurement portion for measuring the feature of the part, the coordinate measurement system including a controller for executing executable programs, the coordinate measurement system including a network interface;

a further network coupled to the network interface;

a server coupled to the further network, the server receiving a request from the coordinate measurement system for an executable program, the request including an operator identifier identifying the operator using the coordinate measurement system, the server restricting access or providing access to the executable program based on the operator identifier;

the server delivering the executable program to the coordinate measurement system if access is available to the coordinate measurement system.

68. The system of claim 38 further comprising:

the coordinate measurement system including a measurement portion for measuring the feature of the part, the coordinate measurement system including a controller for executing executable programs, the coordinate measurement system including a network interface;

a further network coupled to the network interface;

a server coupled to the further network, the sewer receiving a request from the coordinate measurement system for an executable program, the request including a coordinate measurement system identifier identifying the coordinate measurement system requesting the executable program, the server restricting access or providing access to the executable program based on the coordinate measurement system identifier;

the server delivering the executable program to the coordinate measurement system if access is available to the coordinate measurement system.

69. The system of claim 38, further comprising:

an executable program toolkit, the executable program toolkit generating an executable program for execution by the coordinate measurement system, the executable program toolkit inserting a site identifier in an executable program generated using the executable program toolkit; and the coordinate measurement system including a coordinate measurement system site identifier;

wherein the coordinate measurement system executes the executable program in response to a comparison of the executable program site identifier and the coordinate measurement system site identifier.

70. The system of claim 69 wherein the coordinate measurement system compares the executable program site identifier and the coordinate measurement system site identifier.

71. The system of claim 38 wherein:

the three dimensional coordinate measuring system is portable.

72. The system of claim 38 wherein:

the three dimensional coordinate measuring system includes an articulated arm.

73. The system of claim 38 wherein:

the feature to be measured is a dimensional feature.

\* \* \* \* \*

UNITED STATES PATENT AND TRADEMARK OFFICE
CERTIFICATE OF CORRECTION

PATENT NO. : 6,612,044 B2  
APPLICATION NO. : 09/775236  
DATED : September 2, 2003  
INVENTOR(S) : Raab et al.

Page 1 of 1

It is certified that error appears in the above-identified patent and that said Letters Patent is hereby corrected as shown below:

Column 13:  
Line 16, after "executable" delete "to am" and insert therefor --program--

Column 15:  
Line 61, after "experience" insert --level--

Column 17:  
Line 28, after "a" delete "pad" and insert therefor --part--  
Line 44, after "indication" delete "or" and insert therefor --of--

Signed and Sealed this

Fourth Day of September, 2007

JON W. DUDAS  
*Director of the United States Patent and Trademark Office*